March 1, 1966 J. A. RICHARDS 3,238,392
MOISTURE-GOVERNED AUTOMATIC CONTROL FOR IRRIGATION SYSTEM
Filed Feb. 21, 1963
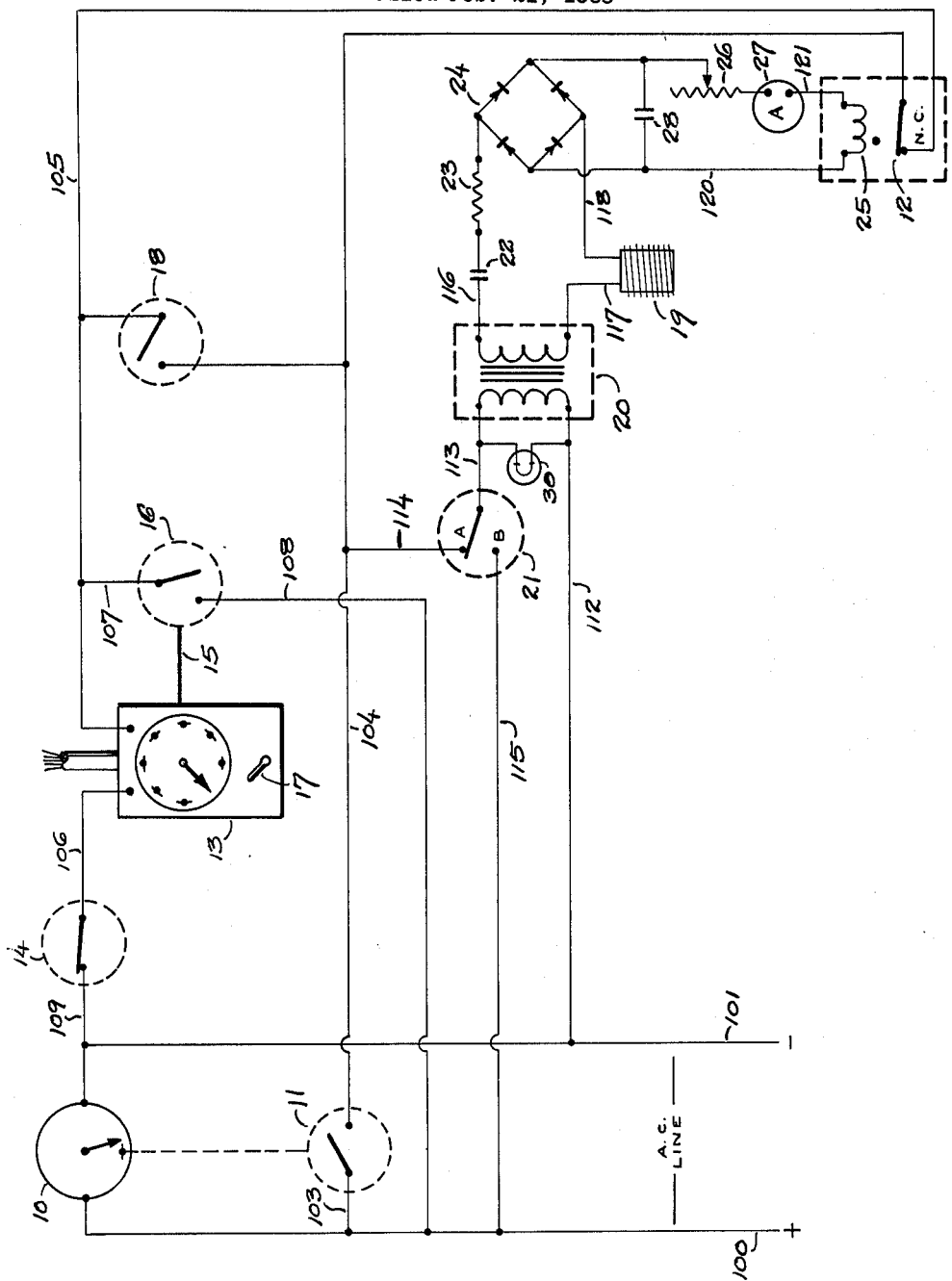
INVENTOR.
JOHN A. RICHARDS
BY
*Seed & Berry*
attys

United States Patent Office 3,238,392
Patented Mar. 1, 1966

3,238,392
MOISTURE-GOVERNED AUTOMATIC CONTROL FOR IRRIGATION SYSTEM
John A. Richards, 2662 NW. Cornell Road,
Portland, Oreg.
Filed Feb. 21, 1963, Ser. No. 260,149
11 Claims. (Cl. 307—116)

This invention relates to an irrigation-controlling system, particularly a system electric in nature which supplies irrigation water in response to the flow of electric current through an electric control device, and one characterized in that the circuit for the electric control device is made and broken automatically according as the moisture condition of the ground which is to be irrigated is below or above a given level.

For its general object, the invention aims to perfect an irrigation-control system of the character illustrated and described in my U.S. Pat. No. 3,039,698, dated June 19, 1962. Said system peculiarly adapts itself to the irrigation of ground areas divided into a plurality of individually watered zones and employs for these ground areas a "moisture-sensing" anode which is embedded in the soil. This sensing anode reflects the resistance imposed by the soil to the flow of electric current, and is wired in a normally open electric control circuit to which current is made available periodically by the operation of an electric clock. Included with the sensing anode in the control circuitry is an electric coil which generates a magnetic field the strength of which is inversely proportional to the soil's resistance to flow of current. Responding or pilot electric circuits are provided which either directly or indirectly cause current to be supplied to a solenoid valve or other electric device the energizing of which causes irrigating water to be delivered to the concerned ground zone. As with the control circuit, current is supplied to the pilot circuits by the operation of the electric clock but the anode and pilot circuits are so interconnected, electrically, that the pilot circuit is completed only when the magnetic field generated by said coil of the anode circuit is below a given value.

In my above-identified patent I show circuitry by which either D.C. or A.C. current can be passed through the anode. A.C. has one distinct advantage. A soil-embedded anode through which alternating current is passing does not deposit conductive material on the anode so as to modify the resistance characteristic which soil of a given moisture condition otherwise presents. The present invention pertains to the type of circuit in which A.C. current is impressed upon the moisture-sensing anode, and D.C. current upon the associated coil which controls the pilot circuit.

Particular objects and advantages of the invention will, together with the above general object, appear and be understood in the course of the following description and claims, the invention consisting in the novel construction and in the adaptation and combination of parts hereinafter described and claimed.

In the accompanying drawing:

The single figure is a diagrammatic view of a control circuit embodying electric devices wired in accordance with the teachings of the present invention.

Denoted in said drawing by the numeral 10 is a continually running time clock included in a 110 v. A.C. circuit provided by line wires 100 and 101. This could be either a 24-hour or a 7-day clock and acts at a selected time or times within each complete revolution to momentarily close a normally open microswitch 11. Said switch has its two terminals connected one by wire 103 with the line wire 100 and the other by wire 104 with one terminal of a normally closed magnetic switch 12. The other terminal of the magnetic switch leads by a wire 105 to one side of an electrically driven selector motor 13, said motor having its other side switch-connected to the line wire 101 by a lead 106. The switch 14 therefor is a manually operated normally closed switch and when opened functions to inactivate the irrigation system.

The selector mtor, when current is supplied across its terminals, starts to move through a single revolution of travel and in course thereof, by solenoids or as may be otherwise desired, successively operates a series of remote irrigation-controlling valves (not shown). The selector motor has a cam which turns in unison therewith and this cam, throughout the complete revolution of the motor, or selector as it will be hereinafter termed, acts by suitable means 15 to close a normally open microswitch 16. One terminal of switch 16 connects by lead 107 to the lead wire 105. The other terminal connects by lead 108 with the line wire 100. It will be thus seen that switch 16 takes over from the momentarily closed switch 11 to make a circuit through the selector 13 causing the latter to complete a revolution of travel, being again opened at the end of such travel. The selector admits of being turn-started by hand, a lever 17 for this purpose being shown.

A manually closed normally open switch 18 provides a cross-over connection between the lead lines 104 and 105, isolating the magnetic switch 12 and permitting clock operation of the system, but without the moisture control hereinafter to be described.

Before proceeding with a description of said moisture control, the nature of the anode should be understood. Designated by 19, this anode is adapted to be embedded in the ground in the area which the present invention is intended to irrigate. The anode which I prefer to employ is composed of a non-conductive core having two non-touching strands of conductive wire wound thereon. The anode becomes a means of determining the relative resistance imposed by the soil to a transfer of current from one to the other strand. The resistance is perforce in inverse ratio to the moisture content of the soil. It will be understood that a single clock can be employed in association with a plurality of anode circuits.

The circuit in which the anode is contained is A.C., reduced by a transformer 20 from 110 v. to 24 v. The input side of such transformer extends across two leads 112 and 113 which are connected one to the line wire 101 and the other to the center tap of a double-throw manual switch 21. The "A" tap of this switch, this being the normal position of the blade, connects by a wire 114 with the lead wire 104. The "B" tap connects by a wire 115 with the line wire 100.

The output side of the transformer 20 extends across two leads 116 and 117. Lead 117 extends to one of said two strands of the anode. The other anode strand connects with a lead 118 and together with a capacitor 22 and a fixed resistor 23 which are introduced in the lead line 116 completes a low-voltage A.C. circuit through the input side of a rectifier 24.

From the output side of the rectifier 24, D.C. current is carried by leads 120 and 121 to a coil 25 for the magnetic switch 12. Included in the lead 121 is a variable resistor 26 and an ammeter 27. 28 denotes a capacitor for the rectifier's output circuit.

The resistance of said variable resistor 26 is pre-set to allow the magnetic switch to open at a given soil moisture condition. The resistance of the fixed resistor 23 is sized to allow a full-scale reading of the ammeter when said resistor 26 is turned to its lowest resistance while the soil is moisture-saturated.

The operation of the system can be described as follows:

It is assumed that the manual switch 14 is closed, and that the clock 10 has reached the time setting at which switch 11 closes. This closing is only momentary and results in current being supplied to the input side of the transformer 20 and, if the resulting rectified current to coil 25 is insufficient to open the normally closed magnetic switch 12, through said switch to the selector 13, causing the latter to initiate a revolution. Within said momentary interval before switch 11 opens, the cam which is driven in concert with the selector acts upon switch 16 to close the blade of the latter and a circuit including the selector is then made from line wire 100 to line wire 101 through the leads 109–106–107–108. This circuit remains closed, causing the selector to successively make contact with each of a succession (seven being shown) of taps for the above-mentioned solenoids or other remote electric control devices for the irrigation system, until the selector has made a complete revolution, at which time the cam opens the switch 16 and the selector stops. Assume, however, that at the time clock 10 had closed the switch 11 the moisture condition of the soil in which the sensing anode 19 is embedded had been at or above the pre-selected value at which the resulting low resistance, combined with that of the resistors 23 and 27, would supply to the coil 25 a sufficient current to open the magnetic switch 12, no current would reach the selector 13 and the latter would remain inactive.

Should it be desired the operator can by-pass the moisture-reading control circuit by closing manual switch 18. The system will then respond to the timing action of clock 10 irrespective of the moisture condition and provides an emergency control to be used in the event of the magnetic switch sticking in an open position. The operator may also activate the selector 13 at any time by turning the lever 17, giving to the selector a sufficient movement to bring the cam into play and responsively close the switch 16. Should the soil at this time have a wet condition causing a sufficiently low resistance the re-current make-and-break action of the magnetic switch, now contained in a circuit comprised of leads 108–107–105–104–114–113–112 and the input side of the transformer 20, causes a signal light 30 to continuously blink. Leads to this signal light are connected across wires 112 and 113.

In addition to the advantages pointed out, the circuitry here portrayed, having switch 11 in series with the magnetic switch 12, and wiring the switch 16 in series with the selector, has the advantage as compared with the circuitry of my above-identified patent of eliminating a holding relay. Aside from the added cost factor the employment of a holding relay introduces the possibility of an accidental operation of the selector in a situation where the soil is sufficiently wet to open the magnetic switch. The problem lies in the fact that before the magnetic switch can completely break contact the coil of the holding relay may be partially energized so as to pull its contacts closed and thus complete a circuit to the selector even though the moisture reading circuit dictates an incomplete circuit. The factor governing the above possibility is the sensitivity of a relay and the relative drag or friction in its mechanical parts. Elimination of the holding relay completely eliminates liability of the selector being operated when the moisture condition of the soil is such that the magnetic field generated by coil 25 is sufficient to lift the blade of the magnetic switch 12.

Light 30 is important not only to indicate when the moisture-control circuit is energized but also, as noted above, to serve by its blinking action to warn of a moisture condition sufficiently high that continued irrigation would be a waste of water.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed langauge fairly admits.

What I claim is:

1. In a control for the type of irrigating system in which irrigating water is supplied from a pressure source of supply upon the energizing of a normally de-energized cycling electric device, the combination with said electric device, a normally open switch closed upon an activation of said electric device and upon said closing energizing the electric device for a holding period sufficient for said device to complete a cycle of operation, two switches in series one of which is a normally closed magnetic switch and the other a normally open switch and operatively interconnected with said electric device so that the latter is energized when both switches are closed, means for closing the normally open switch of said in-series switches for only a momentary period at given intervals of time, a resistor adapted to be embedded in the soil in the area being irrigated and employing the moisture in the soil as a resistance medium, a normally incomplete A.C. electric circuit including said resistor and completed either by a closing of said holding switch or by a closing of said two in-series switches, a coil excited upon a completion of said A.C. circuit and so associated with the magnetic switch that the latter is opened only when the magnetic field of the coil is above a given value, and resistor means capable of being preset to a selected variable resistance and acting as a complement to the soil-embedded resistor to establish for the coil a field potential, sufficient to open said magnetic switch, only when the moisture condition of the ground is at a predetermined high level.

2. A control according to claim 1 in which the current for the A.C. circuit comprises the low-voltage output of a transformer excited by high-voltage A.C. current.

3. A control according to claim 1 in which said A.C. circuit includes the input side of a rectifier the D.C. output of which is fed through said variable resistor to the coil.

4. A control according to claim 1 having a signal light energized by the completion of the A.C. circuit.

5. The control of claim 1 characterized in that the closing of the holding switch is performed mechanically in response to the initiation of the electric device's cyclic movement, means being provided for initiating said cyclic movement manually.

6. A control according to claim 1 having a normally open manually closed switch connected with the momentarily closed switch in a series circuit leading to the electric device and by-passing the magnetic switch.

7. In a control for the type of irrigating system in which irrigating water is supplied from a pressure source of supply upon the energizing of a normally de-energized cycling electric device, the combination with said electric device, a normally open switch closed upon an activation of said electric device and upon said closing energizing the electric device for a holding period sufficient for the latter to complete a cycle of operation, two switches connected in a series circuit paralleling the circuit of the holding switch, said series switches being one a normally closed magnetic switch and the other a normally open switch and operatively interconnected with said electric device so that the latter is activated when both switches are closed, means for closing the normally open switch of said in-series switches for only a momentary period at given intervals of time, a resistor adapted to be embedded in the soil in the area being irrigated and employing the moisture in the soil as a resistance medium, a transformer having its input side connected in parallel with the momentary switch to be excited either by a closing of the holding switch or by the momentary switch when the magnetic switch is also closed, a rectifier receiving for its input circuit low-voltage A.C. output of the transformer and including in said input circuit a fixed resistor together with said soil-embedded resistor, a coil for the magnetic switch included in the D.C. output circuit of the resistor and so associated with said magnetic switch that the latter is opened only when the magnetic field of the coil is above a given value, and a variable resistor also included in the rectifier's output circuit capable of being pre-set to a selected variable resistance and acting as a complement to the soil-embedded resistor and the fixed resistor to establish for the coil a field potential, sufficient to open said magnetic switch, only when the moisture condition of the ground is at a predetermined high level.

8. A control according to claim 7 having a signal light connected across the input terminals of the transformer.

9. A control according to claim 7 having an ammeter included in the output circuit of the rectifier for reading the moisture content of the soil in terms of the line resistance.

10. The control of claim 9 having a double-throw manual switch arranged to be normally placed in one of its two positions for establishing the described circuit which parallels the momentary switch and acting in the other of its two positions to complete a test circuit.

11. In a control for the type of irrigating system in which irrigating water is supplied from a pressure source of supply upon the energizing of a normally de-energized cycling electric timer, the combination with said timer, a normally open holding switch acting when closed to energize the timer for a period sufficient for the latter to complete a cycle of operation, two switches connected in series one a normally closed magnetic switch and the other a normally open switch and operatively interconnected with the holding switch so that the latter is caused to close when both switches are closed, means for closing the normally open switch of said in-series switches for only a momentary period at given intervals of time, a resistor adapted to be embedded in the soil in the area being irrigated and employing the moisture in the soil as a resistance medium, a transformer having its input side connected in parallel with the momentary switch to be excited either by a closing of the holding switch or by the momentary switch when the magnetic switch is also closed, a rectifier receiving for its input circuit low-voltage A.C. output of the transformer and including in said input circuit a fixed resistor together with said soil-embedded resistor, a coil for the magnetic switch included in the D.C. output circuit of the resistor and so associated with said magnetic switch that the latter is opened only when the magnetic field of the coil is above a given value, and a variable resistor also included in the rectifier's output circuit capable of being pre-set to a selected variable resistance and acting as a complement to the soil-embedded resistor and the fixed resistor to establish for the coil a field potential, sufficient to open said magnetic switch, only when the moisture condition of the ground is at a predetermined high level.

No references cited.

LLOYD McCOLLUM, *Primary Examiner.*